United States Patent Office 3,145,698
Patented Aug. 25, 1964

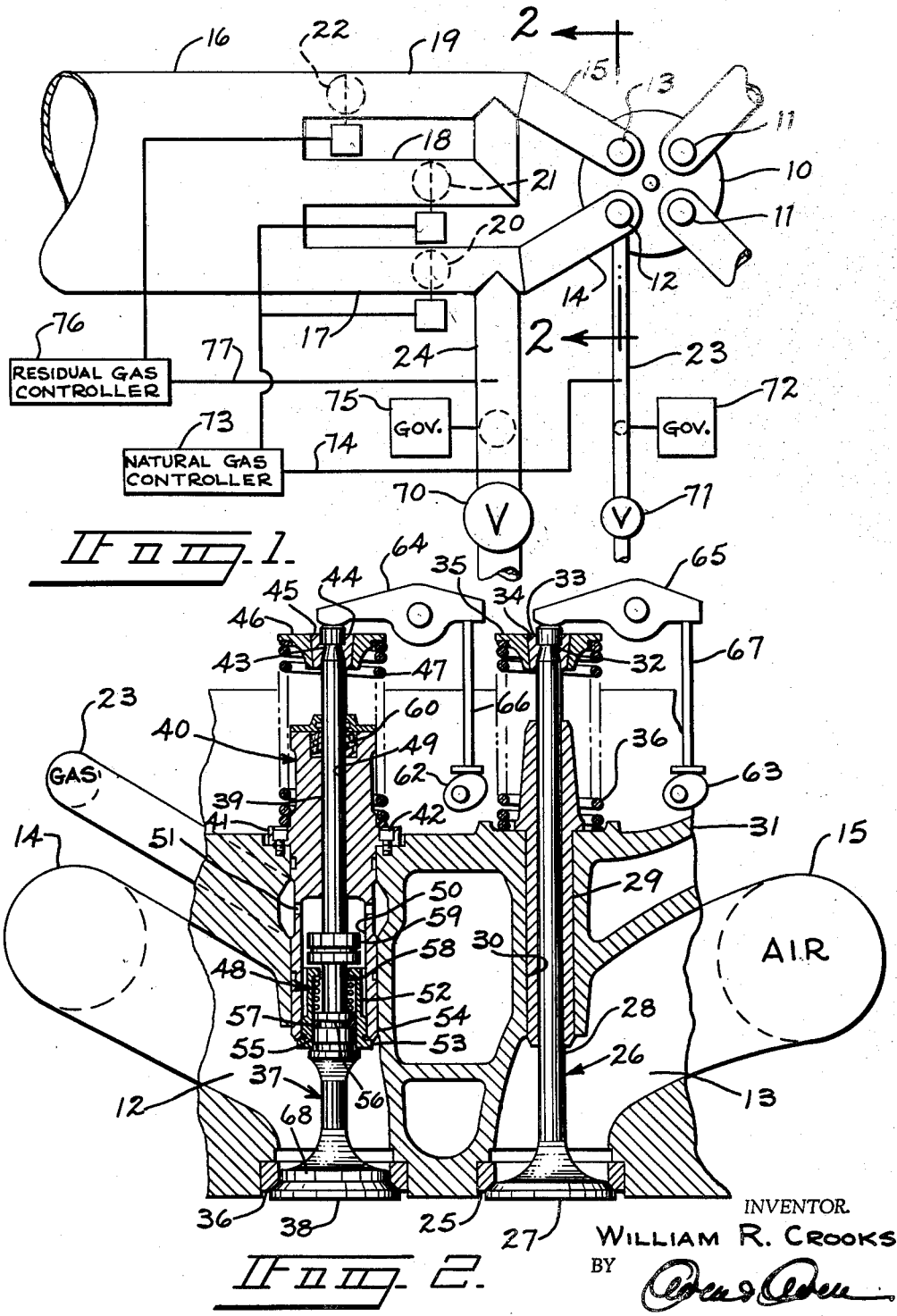

3,145,698
COMBUSTION ENGINE FOR BURNING EITHER HIGH OR LOW SPECIFIC HEAT FUELS
William R. Crooks, Mount Vernon, Ohio, assignor to The Cooper-Bessemer Corporation, Mount Vernon, Ohio, a corporation of Ohio
Filed July 15, 1963, Ser. No. 295,130
4 Claims. (Cl. 123—120)

The present invention relates to an internal combustion engine which can burn either a high specific heat fuel or a low specific heat fuel.

The principal object of the present invention is the provision of a new and improved internal combustion engine which can provide almost the same power output when operating on low specific heat fuels as it does when operating on high specific heat fuels.

The invention resides in certain constructions, and combinations, and arrangements of parts; and further objects and advantages will become apparent to those skilled in the art to which the invention relates from the following description of a preferred embodiment described with reference to the accompanying drawings forming a part of this specification, and in which:

FIGURE 1 is a diagrammatic view of an internal combustion engine and its accompanying manifolding and which embodies the present invention;

FIGURE 2 is a fragmentary sectional view taken approximately on the line 2—2 of FIGURE 1.

The internal combustion engine shown in FIGURE 1 comprises at least one internal combustion cylinder 10 having at least one exhaust port 11 and a pair of intake ports 12 and 13. The intake ports 12 and 13 are supplied with intake gases through separate intake manifolds 14 and 15. The intake manifold 14 communicates with an air supply manifold 16 through a branch manifold 17, and the intake manifold 15 communicates with the air supply manifold 16 through a pair of branch manifolds 18 and 19. Flow control valves 20, 21 and 22 are provided in the respective branch air manifolds 17, 18 and 19.

As above stated, it is an object of the present invention that an internal combustion engine be provided which is capable of operating efficiently both on a conventional high specific heat fuel, and also on a low specific heat gaseous fuel.

The internal combustion engine shown in the drawing is adapted to burn a high specific heat gaseous fuel such as 1000 B.t.u./cu. ft. natural gas under one operating arrangement, and is adapted to burn a low specific heat (100 B.t.u./cu. ft.) fuel under another operating arrangement. High specific heat fuel is fed to the engine through a high specific heat fuel header 23 which enters the intake port 12 and into the cylinder 10, and low specific heat fuel is admitted to the intake manifold 14 through a low specific heat fuel header 24.

Flow of intake air through the intake port 13 is controlled by an annular valve seat 25 and a conventional poppet valve 26. The head 27 of the poppet valve 26 is adapted to abut the valve seat 25, and the stem 28 of the valve 26 extends upwardly through a tubular valve guide 29 which is pressed into an opening 30 in the head 31 of the engine. The upper end of the valve stem 28 projects out of the valve guide 29 and is grooved as at 32 to receive the split halves of a valve keeper 33. The outside surface of the valve keeper 33 is tapered and is received in the conical opening 34 of a valve spring retainer 35. A valve spring 36 is positioned between the top of the head 31 and the valve spring retainer 35 to bias the poppet valve 26 against its valve seat 25.

Fluid flow through the valve port 12 is controlled by a valve seat 36 and a poppet valve 37 having a head 38 which abuts the valve seat 36 to close off flow through the intake port 12. The stem 39 of the valve 37 extends upwardly through a valve barrel and guide 40 which has a flange 41 thereon by means of which the barrel is held in position as by the machine screws 42. The top end of the stem 39 is grooved as at 43 to receive the split halves of a valve keeper 44. The outside of the valve keeper 44 is tapered and is received in the conical opening 45 of a valve spring retainer 46. A valve spring 47 is positioned between the flange 41 of the valve guide 40 and the spring retainer 46 to bias the valve head 38 against the valve seat 36.

Flow of high specific heat fuel from the header 23 to the intake port 12 is controlled, for example, by valve structure 48 which surrounds the valve stem 39 and is opened and closed by its vertical movement. The lower end of the vertical opening 49 through the valve barrel 40 through which the valve stem 39 extends is enlarged as at 50 to provide a valve chamber that is in communication with the fuel header 23 by holes 51 in the side walls of the valve barrel 40. An annular poppet member 52 surrounds the valve stem 39 and has an annular flange or poppet 53 for abutment with a valve seat 54 formed by the end of the valve barrel 40 to control gas flow between the chamber 50 and the intake port 12. The valve stem 39 is slightly enlarged as at 55 within the annular poppet member 52, and the enlarged portion 55 has a recess 56 with an O-ring 57 therein to provide a seal therebetween.

A coil spring 58 is positioned between the enlarged portion 55 of the valve stem 39 and the poppet member 52 to bias the poppet member toward its closed position. The valve stem 39 is provided with a collar 59 positioned above the upper end of the poppet member 52 for abutment with the poppet member 52 to force it out away from its seat on the end of the valve barrel 40 to permit gas flow therethrough. Packing 60 is provided between the valve stem 39 and the upper end of the valve guide 40 to prevent leakage of gas around the valve stem.

The valves 26 and 37 are moved simultaneously by conventional cam operated mechanism shown diagrammatically at 62 and 63. Rocker arms 64 and 65 bear against the upper ends of the valve stems 39 and 28 respectively, and the rocker arms 64 and 65 are activated by push rods 66 and 67 which bear against the cams 62 and 63 respectively.

The engine shown in the drawing is preferably supercharged and air for combustion enters the combustion chamber 10 through intake manifold 15 under pressure. As is customary in supercharged engines, the intake valve 26 is caused to start to open before the exhaust valve is closed so that exhaust gases are purged from the cylinder. As previously stated, the cam structures 62 and 63 cause the valves 26 and 37 to move simultaneously. In order to avoid the flow of low specific heat fuel through the intake port 12 while the exhaust valve is open, a shroud 68 is provided on the head 38 of the valve 37. The shroud 68 is of such a height that the exhaust valve closes before the shroud 68 moves clear of the valve seat 36. There is therefore no valve overlap between the inlet valve 37 and the exhaust valve.

The high specific heat fuel valve 48 is adapted to introduce fuel to the intake passage 12 in such manner that the air flow through the intake passage 12 sweeps the gas into the internal combustion chamber 10. In order that a combustible mixture will not remain in the intake passage 12 after each charging operation of the cylinder 10, the porting of valve 48 is closed before the flow of air through the intake port 12 is stopped. (This is known in the art.)

When it is desired to operate the engine on high specific heat fuel, the shut-off valve 70 in the low specific heat fuel header 24 is closed, and the shut-off valve 71 in the high specific heat fuel header 23 is opened. Air flow through the branch header 19 is prevented either by closing of the control valve 22 or by closing a shut-off valve not shown. Flow of fuel through the high specific heat fuel header 23 is controlled by a governor valve 72 which is usually automatically operated. The discharge pressure established by the governor valve 72 is sensed by the controller 73 through line 74, and the controller in turn operates the control valves 20 and 21 to regulate the amount of air supplied to the intake passages 12 and 13.

When it is desired to operate on low specific heat fuel, the shut-off valve 71 in the high specific heat fuel header is closed and the shut-off valve 70 in the low specific heat fuel header is opened. Flow of air through the branch manifolds 17 and 18 is prevented by either closing of the control valves 20 and 21, or closing other shut-off valves not shown. Flow of low specific heat fuel to the engine is controlled by the governor valve 75, which is usually automatically operated, and its discharge pressure is sensed by the low specific heat gas controller 76 through sensing line 77. The controller 76 in turn operates the controller 22 in the branch air manifold 19 to control the amount of air that is fed to the engine. The following is a table which shows the condition of branch manifolds 17, 18 and 19 when operating with gases of low B.tu. content, and gases of high B.t.u. content:

|  | Branch 17 | Branch 18 | Branch 19 |
|---|---|---|---|
| Low B.t.u | Closed | Closed | Open. |
| High B.t.u | Open | Open | Closed. |

Branch air manifolds 18 and 19 are provided in the embodiment shown in the drawing in order that separate control valves 21 and 22 can be provided for the controllers 73 and 76 respectively. In some instances a single air control valve may be used and suitable means provided for switching control of the single air control valve from one of the controllers 73 and 76 to the other.

Where a high specific heat fuel such as natural gas or a liquid fuel is used, the internal combustion engine must be capable of charging a large amount of air to its internal combustion engine. Where natural gas having a heat content of 1000 B.t.u./cu. ft. is used as the fuel; 18.0 cu. ft. of air must be taken in for each cubic foot of gas. According to the invention both intake manifolds 14 and 15 are utilized for this large air flow. Where a low specific heat fuel, such as one which has a heat content of 100 B.t.u./cu. ft., only 0.92 cu. ft. of air per cubic foot of gas is required. It will now be apparent that excessive pressures would be required to force the required amount of a low specific heat fuel through the same system used for introducing a high specific heat fuel, such as natural gas, and that such an arrangement would not be practical. According to the invention only one of the intake manifolds is used for this smaller air flow, while the other intake manifold is used to conduct the larger fuel flow to the combustion chamber. It will also be apparent that the objects heretofore enumerated have been accomplished by the present invention, and that there has been provided an internal combustion engine normally designed to burn a high specific heat fuel and which can satisfactorily burn a low specific heat fuel without requiring excessive fuel pressures to be used.

While the invention has been described in considerable detail, I do not wish to be limited to the particular embodiment shown and described, and it is my intention to cover hereby all novel adaptations, modifications, and arrangements thereof which come within the practice of those skilled in the art to which the invention relates.

What I claim is:

1. In an internal combustion engine of the type having a cylinder chamber fed by a pair of intake ports that are controlled by separate intake valves: means providing separate intake manifolds to each intake valve, a supply header for a high specific heat fuel, a supply header for a low specific heat fuel, means for supplying air to both of said intake manifolds when gas from said high specific heat fuel header is supplied to said cylinder chamber, and means for valving off air flow through one of said intake manifolds while communicating said low specific heat fuel header to the other of said intake manifolds, whereby both intake manifolds are used to supply air to said cylinder chamber when the engine is run on high specific heat fuel, and the flow capacity of one of the intake manifolds is used to supply low specific heat fuel when the engine is run on the low specific heat fuel.

2. In an internal combustion engine, a cylinder head having a combustion chamber therein, first and second intake manifolds for said internal combustion chamber, first and second intake valves for controlling communication respectively of said first and second intake manifolds with said combustion chamber, cam means operated by said engine, said first and second intake valves being cyclically opened and closed by said cam means, first fuel supply means for introducing a high specific heat fuel into said combustion chamber, said first fuel supply means also being operated by said cam means, second fuel supply means for introducing a low specific heat fuel into said first intake manifold, first throttle means for controlling fuel flow through said first fuel providing means, second throttle means for controlling fuel flow through said second fuel providing means, means for controlling air flow through both first and second intake manifolds when said first throttle means controls the amount of high specific heat fuel fed to the combustion chamber, and means for controlling air flow through said second intake manifold when said second throttle means controls the amount of low specific heat fuel fed said combustion chamber through said first intake manifold.

3. In an internal combustion engine, a cylinder head having a combustion chamber therein, first and second intake manifolds for said internal combustion chamber, first and second intake valves for controlling communication respectively of said first and second intake manifolds with said combustion chamber, a first header for introducing a high specific heat fuel to said first intake manifold upstream of said first intake valve, valve means for opening and closing communication between said first header and said first intake manifold, cam means operated by said engine, said first and second intake valves and said valve means being cyclically opened and closed by said cam means, a second header for introducing a low specific heat fuel to said first intake manifold, a first throttle valve for controlling fuel flow through said first header, a second throttle valve for controlling fuel flow through said second header, means for controlling air flow through said second intake manifold when said second throttle valve controls low specific heat fuel flow through said first intake manifold, and means for controlling air flow through both said first and second intake manifolds when said first throttle valve controls high specific heat fuel flow through said first header.

4. In an internal combustion engine, a cylinder head having a combustion chamber therein, first and second intake manifolds terminating in respective first and second valve ports for said combustion chamber, first and second poppet valves having heads in said combustion chamber and stem portions which project outwardly through said respective first and second valve ports, said valve ports terminating in respective first and second annular valve seats against which said respective heads seat, cam means operated by said engine for opening and closing said poppet valves with respect to respective valve seats, said heads of said first and second poppet valves being moved off of respective valve seats simultaneously by said cam means, a shroud on said head of said first poppet valve for delaying fluid flow through said first valve port until after flow has been established through said second valve port, a first header for introducing a high specific heat fuel to said first intake manifold upstream of said first valve seat, valve means operated by said first poppet valve for opening and closing communication between said first header and said first intake manifold, a second header for introducing a low specific heat fuel to said first intake manifold, a first throttle valve for controlling fuel flow through said first header, a second throttle valve for controlling fuel flow through said second header, means for controlling air flow through said second intake manifold when said second throttle valve controls low specific heat fuel flow through said first intake manifold, and means for controlling air flow through both first and second intake manifolds when said first throttle valve controls high specific heat fuel flow through said first header.

References Cited in the file of this patent
UNITED STATES PATENTS

| | | |
|---|---|---|
| 2,682,866 | Rhoades | July 6, 1954 |
| 2,929,366 | Kotlin | Mar. 22, 1960 |
| 3,016,886 | Benz | Jan. 16, 1962 |